United States Patent Office 3,301,139
Patented Jan. 31, 1967

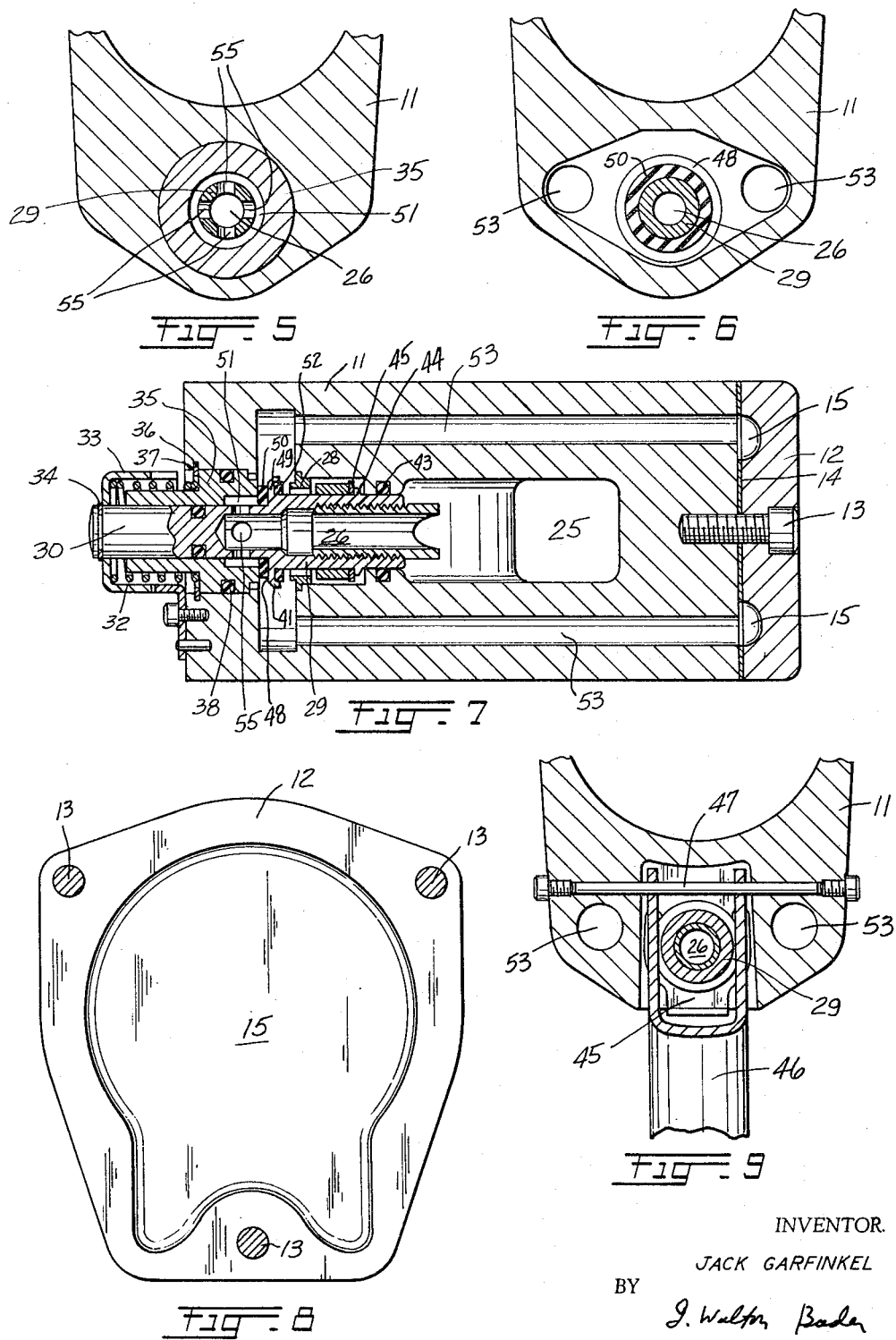

3,301,139
PRESSURE AIR ACTUATED TOOL AND VALVE
STRUCTURE FOR USE THEREWITH
Jack Garfinkel, Bayside, N.Y., assignor to Speedfast
Corporation, Long Island City, N.Y., a corporation of
New York
Filed Sept. 29, 1964, Ser. No. 400,176
7 Claims. (Cl. 91—355)

This invention relates to a valve and to a fluid actuated machine utilizing the same. The fluid actuated machine can drive nails, staples, or similar fasteners or can be used for other driving purposes.

In fluid actuated machines such as those involved in this invention it is important that the machine drive through a full cycle. Unless structure is provided to insure full cycle driving a careless operator may jam the device. For example, if full cycling of the device requires full opening of the valve, and the operator should only partially open the valve, then the device will only go through a portion of a cycle and jam. Similarly if full cycling of the machine requires that the valve be closed immediately after a cycle is completed and the operator should close the valve prematurely or too late, jamming will again occur.

If the valve of this invention is used in connection with the fastener driving machine for which it is designed, it will be impossible for the operator to have the tool go through less than a full cycle or more than a full cycle. If the valve is even partially opened the structure involved will keep the valve open even if the operator attempts to close it prematurely until the full cycle has been gone through. Furthermore, no matter how many times the operator attempts to open and close the valve while the tool is cycling, it will have no effect on the cycle.

The tool of this invention is most effacacious when utilized in connection with the blind anvil fastening device magazine and anvil structure shown in the pending application of Vincent A. Zike, Serial No. 198,998, filed May 31, 1962, now Patent Number 3,224,657. However the tool is also applicable to drive other types of fasteners by utilization of the proper driving mechanism secured to the piston of this device. The driving mechanism which can be utilized in connection with this invention forms no part thereof.

The valve of this invention is also utilizable in applications other than those involving the fluid actuated machine of this invention. For this reason the valve is also separately claimed.

The above constitutes a brief description of this invention and the objects and advantages thereof.

The invention will now be further described by reference to the accompanying drawings which are made a part of this specification.

FIG. 5 is a sectional view taken along lines 5—5 of FIG. 2 showing details of the structure of the valve.

FIG. 6 is a sectional view showing further details of construction of the valve and the chamber associated therewith.

FIG. 7 is a sectional view taken along lines 7—7 of FIG. 2 showing further details of construction.

FIG. 8 is a sectional view taken along lines 8—8 of FIG. 3.

FIG. 9 is a sectional view taken along lines 9—9 of FIG. 2.

Figure 1:
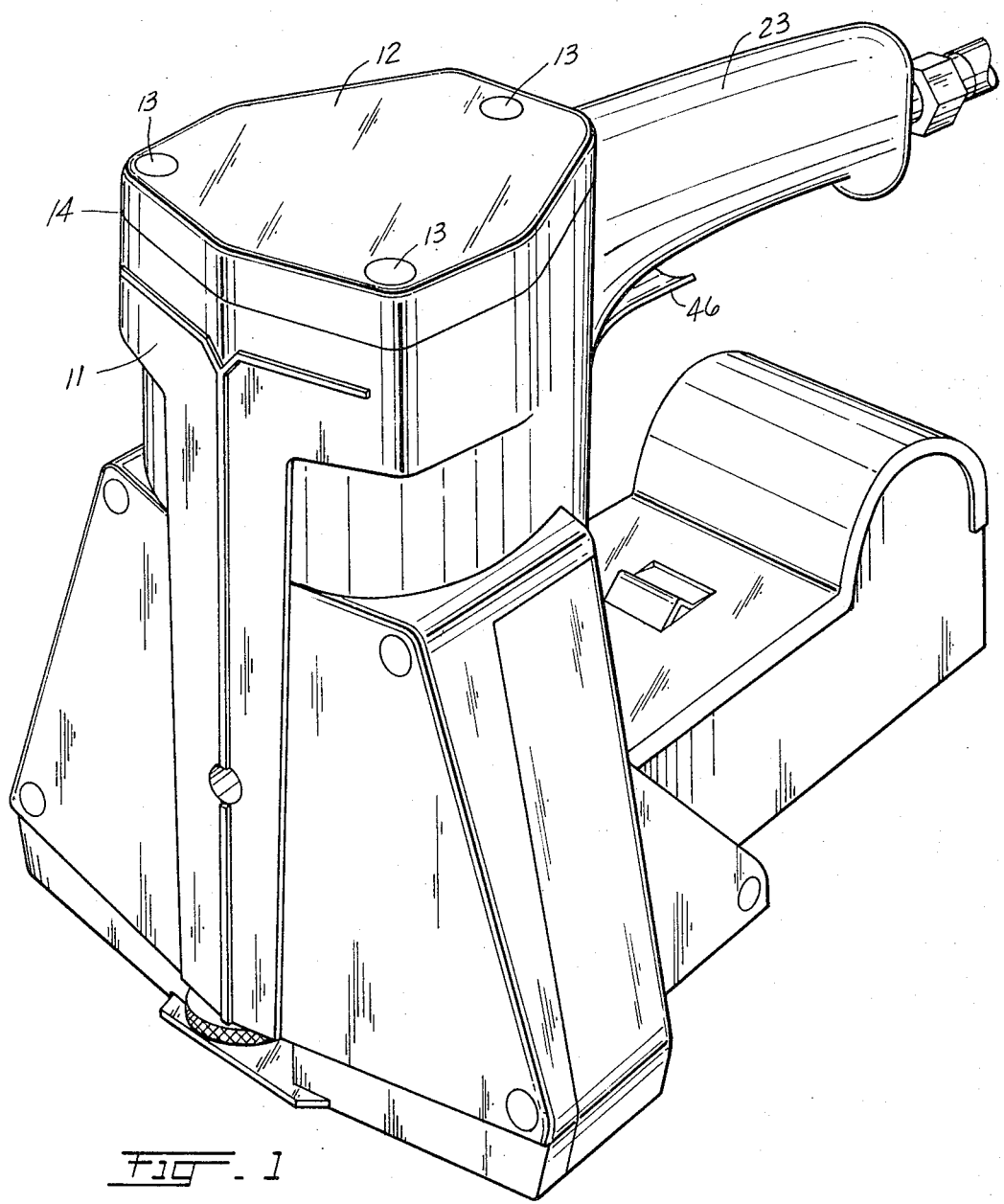
FIG. 1 is a perspective view of the front and side portions of a fluid actuated machine made in accordance with this invention.
Figure 2:
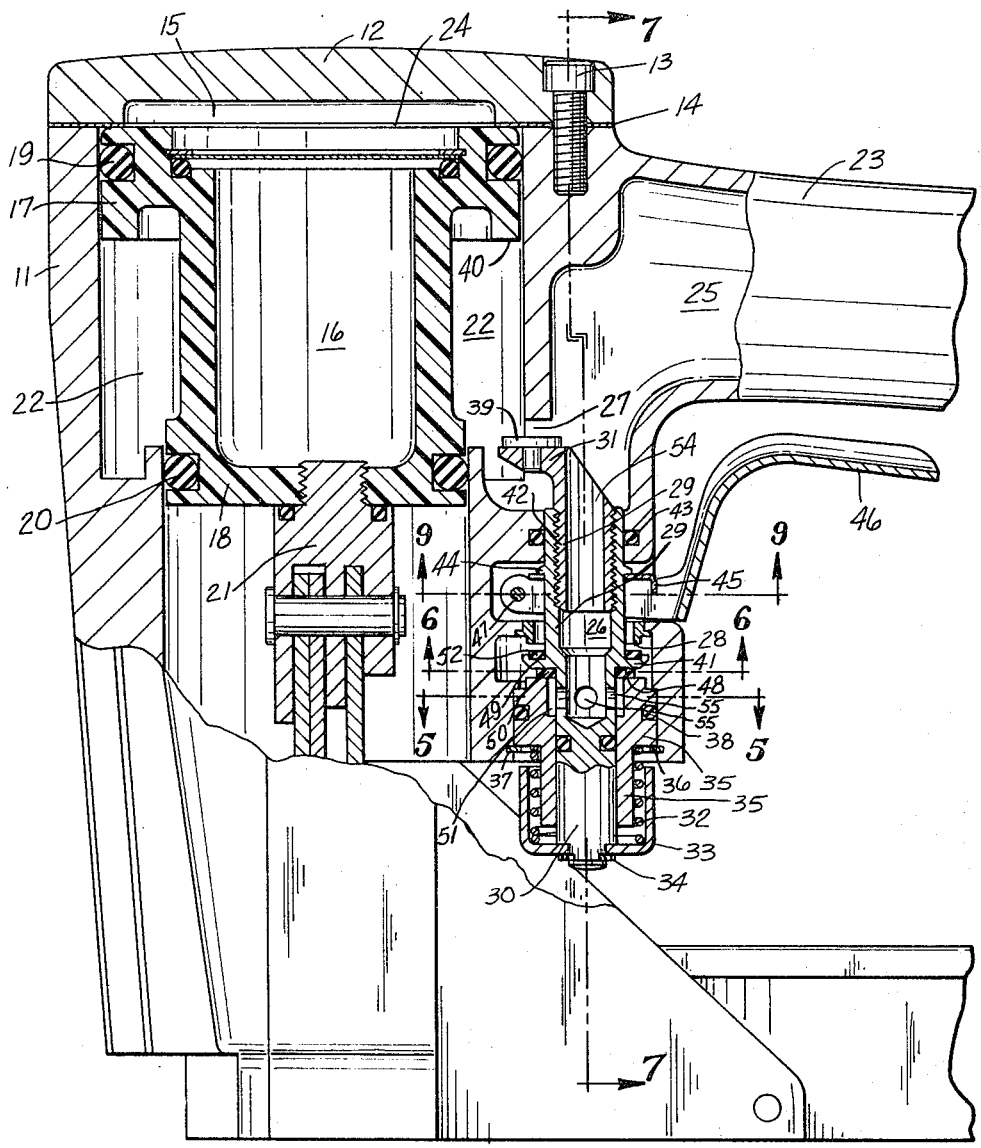
FIG. 2 is a fragmentary side view, partly in section, of a fluid actuated machine made in accordance with this invention. In this view pressure air is supplied to the device but the parts are in the normal rest position.
Figure 3:
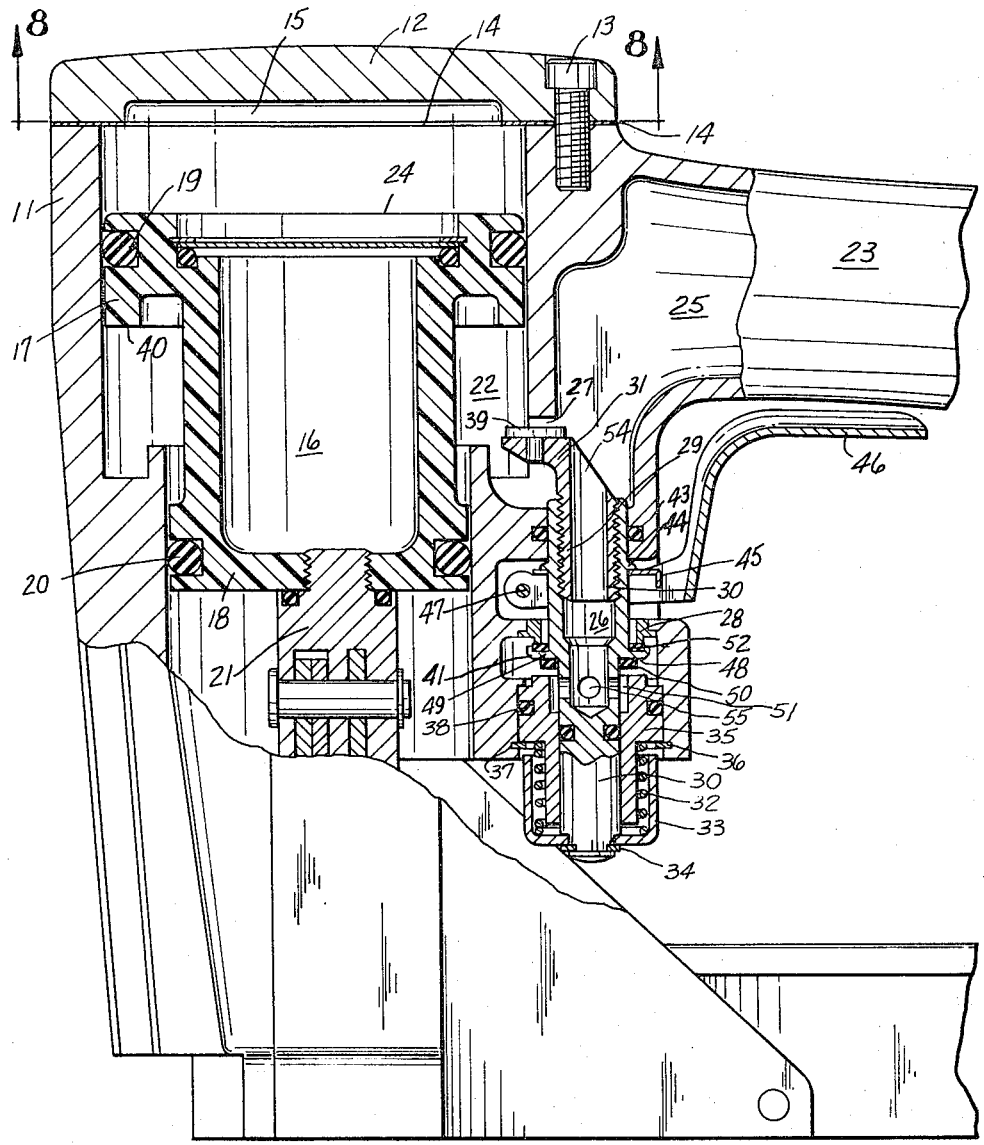
FIG. 3 is a view similar to that of FIG. 2 but showing the position that the parts assume immediately after the valve member is moved from its normal rest position to operate the device.
Figure 4:
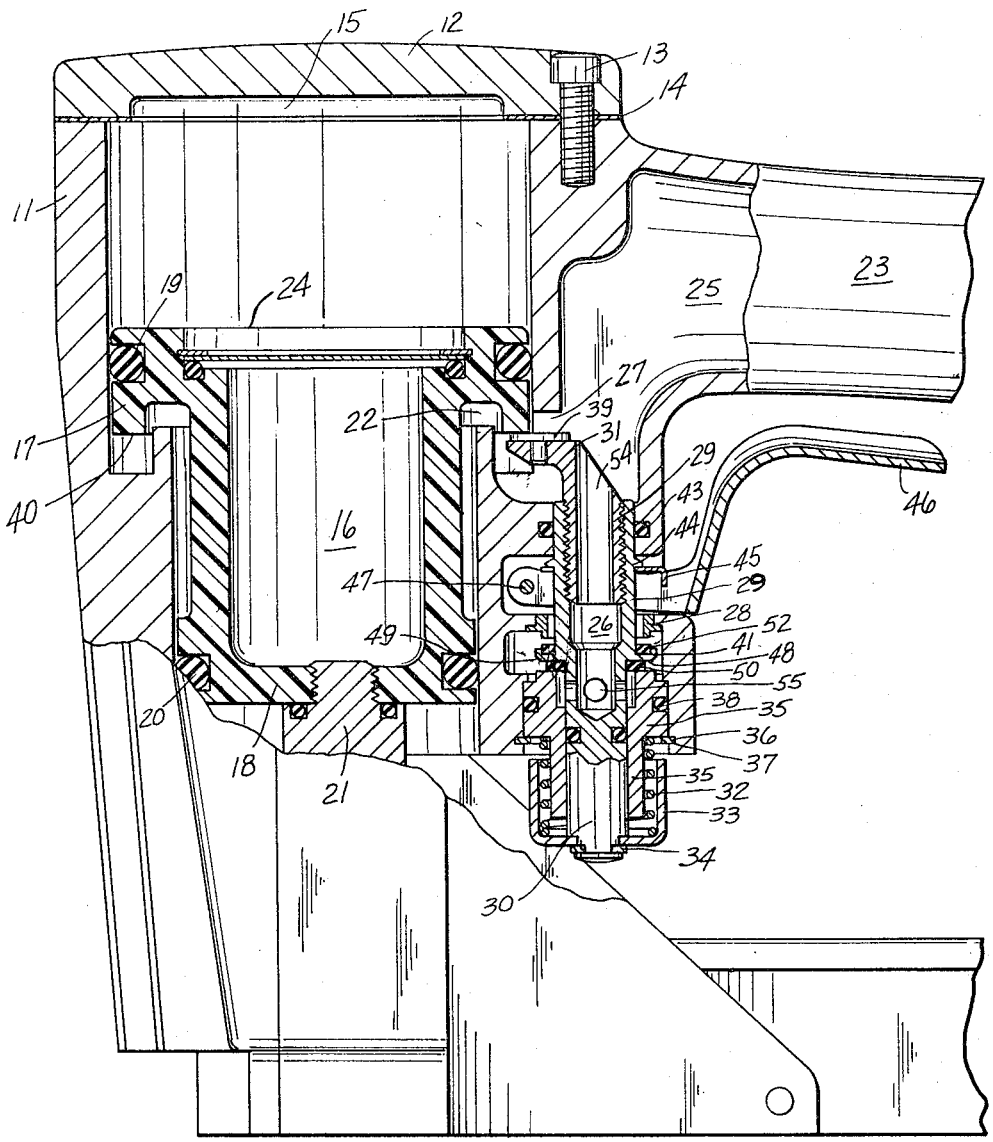
FIG. 4 is a view similar to that of FIGS. 2 and 3 but showing the position that the parts assume as the piston member of the tool proceeds downwardly and contacts the strike plate to move the valve member into its normal rest position.

The invention will now be further described by reference to the specific forms thereof as shown in the accompanying drawings which represent the best mode known to the inventor of taking advantage of this invention. In this connection, however, the reader is informed that said specific forms of this invention are merely for illustrative purposes and for purposes of example. Various changes and modifications could obviously be made within the spirit and scope of this invention and would occur to those skilled in this art.

Referring to the drawings a housing 11 is provided. A cap 12 overlies housing 11 and is secured thereto by screws 13. A gasket 14 lies between cap 12 and housing 11 to prevent air leakage. A first air chamber 15 is provided within housing 11.

A piston 16 is slidably and downwardly movable within housing 11. Piston 16 has an upper portion 17 bearing an upper face 24 and a lower face 40 and a lower portion 18 of lesser diameter than portion 17. Sealing rings 19 and 20 are provided to prevent leakage of air out of housing 11.

A working portion 21 is secured to piston 16 and may be operatively connected to structure such as that described in the patent application of Vincent A. Zike, Serial Number 198,998, including a magazine and driving mechanism to drive staples into cartons for sealing purposes. Since this structure forms no part of the invention it is not shown here. Working portion 21 could also be connected to other types of structures so as to drive nails, staples, rivets or the like.

A second air chamber 22 is disposed upon piston 16 and is normally filled with pressure air. The air impingement area caused by chamber 22 upon piston 16 is less than the area which can be acted upon by chamber 15. This is required for proper working of the tool as will be subsequently explained.

A handle 23 is provided which bears pressure air inlet means (not shown). Handle 23 has space 25 therewithin for the travel of pressure air. Space 25 communicates with chamber 22 through opening 27.

A third air chamber 26 is also provided within housing 11. Chamber 26 bears an upper sealing portion 28 upon its upper face. A hollow stem member 29 is formed with a lower projecting portion 30 and an upper projecting portion 31. Member 29 is also provided with a plurality of openings 55. Portion 30 bears a coil spring 32 thereabout and a shield member 33 about spring 32. Member 33 is secured to portion 30 by C-ring 34.

Support member 35 is secured within the lower portion of chamber 26 by C-ring 36 which is disposed in a groove 37 cut into the wall of chamber 26. An O-ring 38 is provided to insure that no air will leak past member 35.

Upper portion 31 of stem 29 is formed with a strike plate 39. This plate is normally spaced from the lower face 40 of portion 17 of piston 16 but will contact the same when the piston is in downward position. Strike plate 39 is also secured to threaded portion 42 which is in turn threadedly secured to stem 29 so that the position of strike plate 39 can be adjusted. An O-ring 43 is also provided to seal air in place.

An enlarged portion 44 is also provided upon stem 29 and a yoke 45 connected thereto. Yoke 45 is in turn connected to trigger 46 which is pivotally movable about pin 47.

An actuating element 41 is also secured to stem 29. Element 41 is formed with a base 48 and an upwardly and outwardly flared portion 49. Base 48 bears a seal 50 which normally overlies opening 51 within support member 35. Portion 49 of element 41 is dished at its upper end and bears an additional seal 52. In normal position seal 52 is spaced from sealing portion 28.

A plurality of conduits 53 are connected to chamber 26 and also communicate with chamber 15.

With the foregoing specific description the operation of this invention will now be explained.

In the normal rest position of the device chamber 26 is open to atmosphere since member 41 is spaced from sealing portion 28. Pressure air passes through space 25 into hollow space 54 of stem 29 and out opening 55. The pressure air cannot escape from stem 29 since member 41 overlies opening 51. The pressure of spring 32 is greater than the air pressure exerted upon member 41 so that the valve remains closed. At the same time pressure air flows from space 25 into space 27 and thence into space 22 thereby forcing piston 16 into its upmost rest position. When trigger 46 is pulled stem 29 is caused to rise. This causes a space to form between seal 50 and opening 51 causing pressure air to escape. Element 41 bears a flared portion. Thus, by reason of the construction of the parts, the pressure air forces element 41 upwardly as far as it can and causes seal 52 to contact portion 28 thus closing chamber 26 and causing pressure air to flow therein. The pressure air holds element 41 in place and flows through conduits 53 impinging against face portion 24 of piston 16. Since the air impingement area of portion 24 is greater than that of portion 40 piston 16 moves downwardly. As this occurs portion 40 abuts strike plate 39 thereby forcing stem 29 downwardly against the pressure of the air in chamber 26 and into its normal rest position. This causes chamber 26 to become open to atmosphere and the pressure air within chamber 15 now exhausts through conduits 53 to atmosphere. The air pressure now bearing against portion 40 of piston 16 brings the piston upwardly to its normal rest position.

It must be noted that once trigger 46 is pulled the air pressure released must cause the tool to go through a complete cycle. If trigger 46 is only partially pulled the air pressure will still force member 41 to its full closed position. If trigger 46 is pulled while the tool is cycling it will have no effect upon the cycle.

The foregoing illustrates the manner in which the objects of this invention are achieved.

I claim:

1. A fluid valve structure comprising a normally unpressurized chamber having a sealing portion thereupon, a valve member axially movable within said chamber having a body portion carrying pressure fluid outlet means thereupon, an actuating element secured to said body portion normally preventing escape of pressure fluid into said chamber through said fluid outlet means, pressure fluid actuated holding means upon said actuating element for causing said element to move to extreme position and against said sealing portion, first means upon said body portion for mechanically moving said portion in one direction, means for actuating said first means, second means upon said body portion for mechanically moving said portion in the reverse direction, means for actuating said second means, actuation of said first mechanical means permitting escape of pressure fluid into said chamber through said pressure fluid outlet means and actuation of said holding means so that said actuating element moves to said extreme position and seals said chamber, actuation of said second mechanical means causing said body portion to move in reverse direction and cause said parts to return to normal position.

2. A fluid valve structure comprising a normally unpressurized chamber having a sealing portion thereupon, a support member within said chamber provided with an opening therewithin, a valve member having a stem portion axially movable within said support member provided with pressure fluid outlet means upon the part of said stem within said support member, an actuating element carried by said stem portion having a base normally lying upon the opening within said support member and normally preventing escape of pressure fluid into said chamber through said pressure fluid outlet means, said actuating element also having a flared portion adjacent said base, first means upon said stem for mechanical movement in one direction, means for actuating said first means, second means upon said stem for mechanical movement in the reverse direction, means for actuating said second means, actuation of said first mechanical means permitting escape of pressure fluid into said chamber through said pressure fluid outlet means and impingement of said pressure fluid upon said flared portion so as to cause said actuating element to abut said sealing portion and seal and pressurizing said chamber, actuation of said second mechanical means causing said stem to move in reverse direction and cause said parts to return to normal position.

3. A fluid valve structure comprising a normally unpressurized chamber having a sealing portion thereupon, a support member within said chamber provided with an opening therewithin, a valve member having a stem portion axially movable within the opening in said support member provided with pressure fluid outlet means on the part of said stem within said support member, an actuating element carried by said stem portion having a base normally lying upon the opening within said support member and normally preventing escape of pressure fluid into said chamber through said pressure fluid outlet means, said actuating element also having a flared portion adjacent said base, spring means carried by said stem for maintaining said parts in normal position, first means upon said stem for mechanical movement in one direction, means for actuating said first means, second means upon said stem for mechanical movement in the reverse direction, means for actuating said second means, actuation of said first mechanical means permitting escape of pressure fluid into said chamber through said pressure fluid outlet means and impingement of said pressure fluid upon said flared portion of said actuating element so that said actuating element abuts said sealing portion and seals and pressurizes said chamber so that said stem is maintained in said position until mechanically displaced, actuation of said second mechanical means causing said stem to move in reverse direction and thus cause said parts to return to normal position.

4. A fluid valve structure comprising a normally unpressurized chamber having a sealing portion at the top thereof, a support member at the bottom of said chamber provided with an opening therewithin, a valve member having a hollow stem portion for carrying pressure fluid axially movable within the opening in said support member provided with a plurality of outwardly extending openings, an actuating element carried by said stem portion having a base carrying a first sealing element thereupon normally lying upon the opening within said support member and normally preventing escape of pressure fluid into said chamber through said outwardly extending openings, said actuating element also having a flared portion adjacent said base and a second sealing element upon its upper surface, spring means carried by said stem normally holding said stem in its normal position, said spring having less force than the pressure fluid force which can be applied to said flared portion, first means carried by said stem for mechanical movement in one direction, means for actuating said first means, second means upon said stem for mechanical movement in the reverse direction, means for actuating said second means, actuation of said first mechanical means permitting escape of pressure fluid into said chamber through said openings and impingement of said pressure fluid upon said flared portion of said actuating element so that said actuating element moves, abuts said sealing portion and pressurizes said chamber so that said stem is maintained in said position until mechanically displaced, actuation of said second mechanical means causing said stem to move in reverse direction and thus unpressurize said chamber and cause said parts to return to normal position.

5. A pressure air actuated tool comprising a housing pressure air inlet means operatively connected with said housing, a piston movable within said housing, said piston having a greater pressure air impingement area at its upper portion than at its lower portion, a first air chamber operatively connected to the upper portion of the piston, a second air chamber operatively connected to the lower portion of the piston, means for conveying pressure air to the second air chamber, a normally unpressurized third air chamber within said housing having a sealing portion thereupon, conduit means connecting said third air chamber with said first air chamber, a valve member axially movable within said third air chamber having a body portion having pressure air outlet means thereupon, an actuating element secured to said body portion normally preventing escape of pressure air into said third air chamber through said outlet means, pressure air actuated holding means upon said actuating element for causing said element to move to extreme position and against said sealing portion, first means upon said body portion for mechanically moving said portion in one direction, second means upon said body portion normally spaced from the lower portion of said piston but impingeable with said piston when said piston moves downwardly for mechanically moving said body portion in the reverse direction, movement of said first mechanical means permitting escape of pressure air into said third air chamber through said pressure air outlet means and thus causing actuation of said holding means so that said actuating element moves to said extreme position and seals said chamber, pressure air thence travelling to said first air chamber and moving said piston downwardly, said piston thence impinging upon said second mechanical means causing said body portion to move in reverse direction and thus unpressurize said first and third air chambers so that said piston and said valve parts return to normal position.

6. A pressure air actuated tool comprising a housing, pressure air inlet means operatively connected with said housing, a piston slidably movable within said housing, said piston having a greater pressure air impingement area at its upper portion than at its lower portion, a first air chamber operatively connected to the upper portion of the piston, a second air chamber operatively connected to the lower portion of the piston, means operatively connected with said air inlet means for conveying pressure air to said second air chamber, a normally unpressurized third air chamber within said housing having a sealing portion thereupon, a support member within said third air chamber provided with an opening therewithin, a valve member having a hollow stem portion adapted to carry pressure air and provided with outlet openings upon the part of the stem normally within said support member, an actuating element carried by said stem portion having a base portion normally lying upon the opening within said support member and normally preventing escape of pressure air into said third chamber through said pressure air outlet means, said actuating element also having an outwardly flared portion adjacent said base, said flared portion being movable into sealing engagement with said third air chamber upon impingement of pressure air thereupon, first means upon said stem for causing mechanical movement in one direction, second means upon said stem normally spaced from the lower portion of said piston but impingeable with said piston when said piston moves downwardly, said second means causing said stem to move in the opposite direction, movement of said first means permitting escape of pressure air into said third air chamber through said pressure air outlet means and causing said air to impinge upon said flared portion of said actuating element so as to move said element into sealing engagement with said chamber and permit pressurization thereof so that said piston moves downwardly, said downward movement of said piston causing actuation of said second means permitting return of the parts of the device to their normal rest positions.

7. A pressure air actuated tool comprising a hollow housing, a handle connected to said housing having pressure air inlet means thereupon, a substantially circular piston slidably movable within said housing, said piston having an upper portion and a lower portion of lesser diameter, a working portion downwardly depending from the lower portion of said piston, said piston having a greater air impingement area at the top of its upper portion than at the bottom of its upper portion, a first air chamber operatively connected with the top of the upper portion of the piston, a second air chamber operatively connected with the bottom of the upper portion of the piston, means operatively connected with said air inlet means for conveying pressure air to said second air chamber, a normally unpressurized substantially circular third air chamber within said housing having a sealing portion upon its upper face, a circular support member secured within the bottom of said third air chamber provided with a centrally disposed circular opening therewithin, a hollow stem member adapted to carry pressure air slidably movable within said third air chamber and projecting from said third air chamber in both directions, said stem member provided with a plurality of outwardly extending openings upon the part of the stem normally within said support member, a spring member secured upon the lower projecting portion of said stem, a strike plate disposed upon the upper projecting portion of said stem, an actuating element carried by an intermediate portion of said stem having a base carrying a first sealing element thereupon, said base normally lying upon and closing the opening within said support member preventing escape of pressure air into third air chamber through said outwardly extending openings, said actuating element also having an outwardly and upwardly flared portion adjacent said base and a second sealing element upon its upper surface, a yoke portion upon said stem above said third air chamber, a pivotally movable lever arm attached to said yoke, movement of said yoke raising said stem and permitting pressure air to move against said flared portion of said actuating element, said pressure air having greater force than the pressure of said spring so as to move said actuating element into sealing abutment with said sealing portion of said third air chamber so as to close and pressurize the same, said pressure air thence passing into said first air chamber and moving said piston downwardly, said downward movement of said piston causing engagement of said strike plate and movement of said stem into its normal rest position.

References Cited by the Examiner

UNITED STATES PATENTS

| | | | |
|---|---|---|---|
| 2,159,879 | 5/1939 | Dewandre | 91—355 |
| 2,322,611 | 6/1943 | Winkler | 91—42 |
| 2,388,224 | 11/1949 | Mathorn | 91—355 |
| 2,729,198 | 1/1956 | Faccou | 91—355 |
| 2,740,859 | 4/1956 | Beattey et al. | 91—355 |
| 2,997,271 | 8/1961 | Bounds | 91—355 |
| 3,087,466 | 4/1963 | Tobias | 91—417 |

MARTIN P. SCHWADRON, *Primary Examiner.*

PAUL E. MASLOUSKY, *Examiner.*